US010691287B2

United States Patent
Doi et al.

(10) Patent No.: US 10,691,287 B2
(45) Date of Patent: Jun. 23, 2020

(54) TOUCH PANEL TYPE INFORMATION TERMINAL DEVICE, INFORMATION INPUT PROCESSING METHOD AND PROGRAM THEREOF

(71) Applicant: NIPPON TELEGRAPH AND TELEPHONE CORPORATION, Tokyo (JP)

(72) Inventors: Shinichi Doi, Musashino (JP);
Takayuki Nakamura, Musashino (JP);
Eiji Kobayashi, Musashino (JP);
Hiroyuki Tanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 45 days.

(21) Appl. No.: 15/735,860

(22) PCT Filed: Jul. 25, 2016

(86) PCT No.: PCT/JP2016/071743
§ 371 (c)(1),
(2) Date: Dec. 12, 2017

(87) PCT Pub. No.: WO2017/018384
PCT Pub. Date: Feb. 2, 2017

(65) Prior Publication Data
US 2018/0173398 A1 Jun. 21, 2018

(30) Foreign Application Priority Data
Jul. 28, 2015 (JP) .................. 2015-148687

(51) Int. Cl.
*G06F 3/048* (2013.01)
*G06F 3/0481* (2013.01)
*G06F 3/0488* (2013.01)

(52) U.S. Cl.
CPC ...... *G06F 3/04812* (2013.01); *G06F 3/04883* (2013.01); *G06F 2203/04801* (2013.01); *G06F 2203/04808* (2013.01)

(58) Field of Classification Search
CPC ................. G06F 3/017; G06F 3/04812; G06F 2203/04808
See application file for complete search history.

(56) References Cited

U.S. PATENT DOCUMENTS

| 6,311,177 | B1 * | 10/2001 | Dauerer | ............. G06F 3/04812 |
| 2001/0045936 | A1 * | 11/2001 | Razzaghi | ................ G06F 3/038 345/156 |

(Continued)

FOREIGN PATENT DOCUMENTS

| JP | H10-133822 A | 5/1998 |
| JP | H11-353069 A | 12/1999 |

(Continued)

OTHER PUBLICATIONS

English translation of the International Preliminary Report on Patentability (Chapter I), IB, Geneva, dated Jan. 30, 2018, incorporating the English translation of the Written Opinion of the ISA, dated Aug. 23, 2016.

(Continued)

*Primary Examiner* — Claudia Dragoescu
(74) *Attorney, Agent, or Firm* — Harness, Dickey & Pierce, P.L.C.

(57) ABSTRACT

The point target can be easily and accurately instructed without disturbing the viewability of the point target and its neighboring display information.
A touch panel type information terminal device comprises means for displaying on a display screen a touchable pointer comprising a pointer part for instructing a point target that is displayed on a display screen, and an operation part for a user to perform a touch operation, and means for integrally (Continued)

moving a display position of the operation part and the pointer part on the display screen in accordance with the touch operation of the user with respect to the operation part of the touchable pointer.

14 Claims, 11 Drawing Sheets

(56) References Cited

U.S. PATENT DOCUMENTS

| | | | |
|---|---|---|---|
| 2006/0026523 | A1 | 2/2006 | Kitamaru et al. |
| 2009/0251410 | A1 | 10/2009 | Mori et al. |
| 2012/0054671 | A1* | 3/2012 | Thompson ............... G06F 3/038 715/784 |
| 2013/0249813 | A1* | 9/2013 | Locker ................. G06F 3/04812 345/173 |
| 2013/0271430 | A1 | 10/2013 | Nakamura |
| 2014/0028557 | A1* | 1/2014 | Otake ................. G02F 1/13338 345/158 |
| 2014/0191961 | A1 | 7/2014 | Mori et al. |
| 2014/0313130 | A1* | 10/2014 | Yamano ................. G06F 3/0488 345/157 |

FOREIGN PATENT DOCUMENTS

| | | |
|---|---|---|
| JP | 2000-163031 A | 6/2000 |
| JP | 2000-276471 A | 10/2000 |
| JP | 2006-40132 A | 2/2006 |
| JP | 2009-245239 A | 10/2009 |
| JP | 2010-272036 A | 12/2010 |
| JP | 2013222263 A | 10/2013 |
| WO | WO-2013/094371 A1 | 6/2013 |

OTHER PUBLICATIONS

Extended European Search Report regarding EPSN 168304897, dated Feb. 25, 2019.
International Search Report for PCT/JP2016/071743, ISA/Japan, Tokyo, dated Aug. 23, 2016.
Written Opinion of the ISA for PCT/JP2016/071743, ISA/Japan, Tokyo, dated Aug. 23, 201.
"Touch panel technique article/technological trend of resistive touch panel", SMK Corporation, TP project department, reference: Denpa Publications, "touch panel technique" featured Oct. 10, 2013, internet <URL; http://www.smk.co.jp/products/touch_panels/technology/20131010dempaRTTP/>.
Japanese Office Action—Decision of Refusal—regarding related application JP 2017-530861, JPO, dated Aug. 21, 2018 with English translation attached.
Japanese Office Action for parallel application JP 2017-530861, JPO, dated Jun. 5, 2018, with English translation attached.
Japanese Pre-Appeal Examination Report regarding JPSN 2017530861, dated Jan. 25, 2019.

* cited by examiner

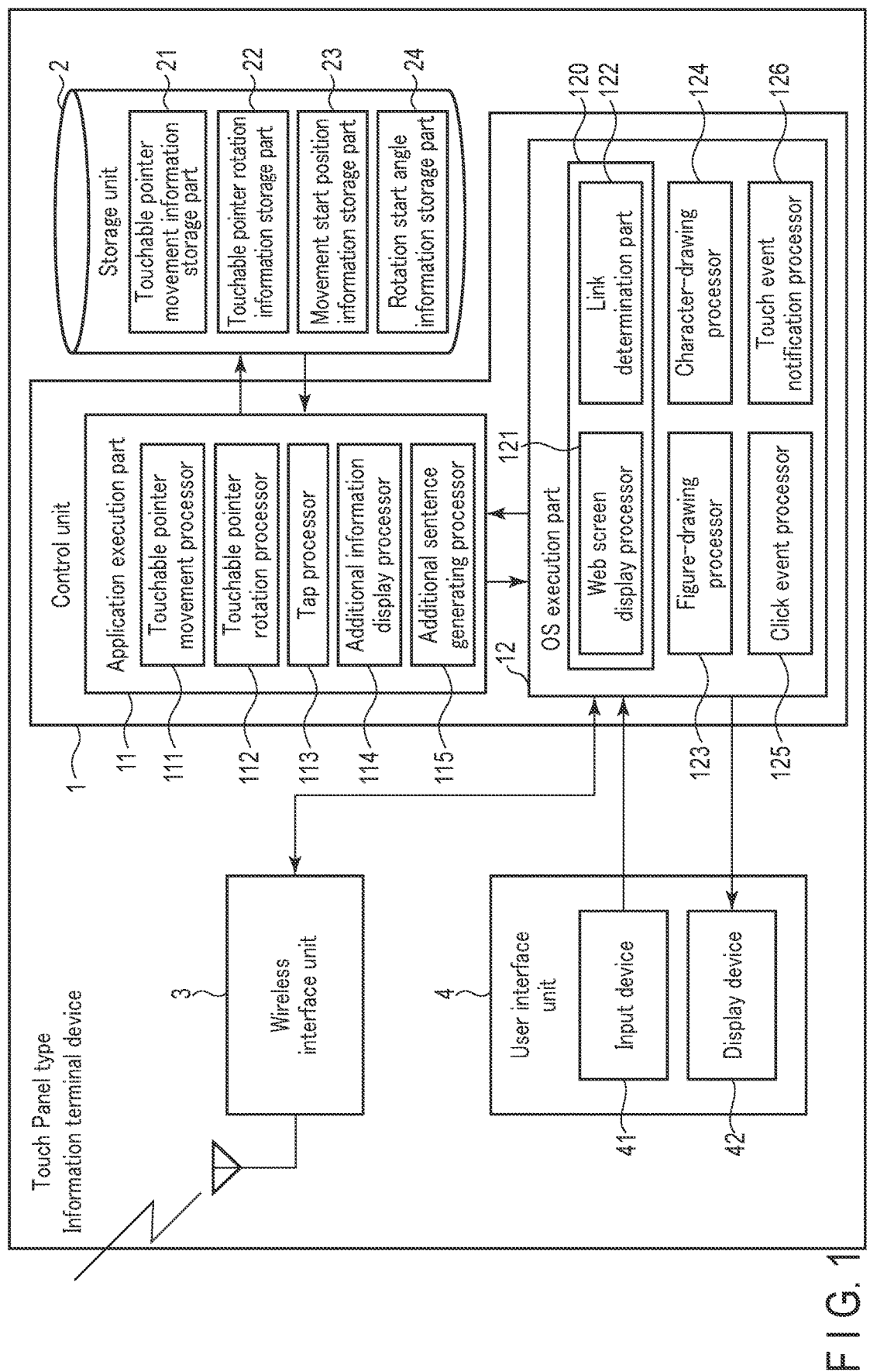
F I G. 1

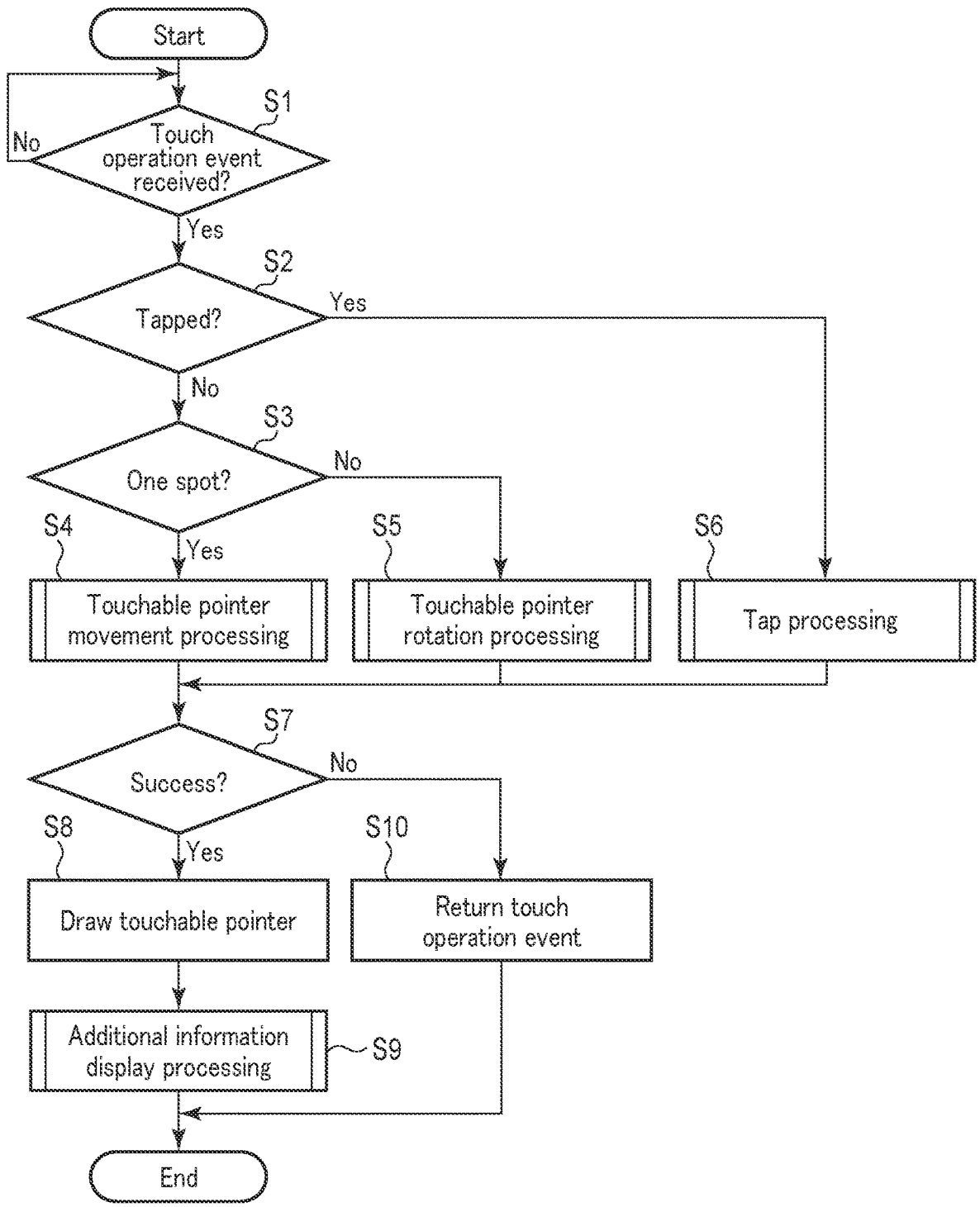
F I G. 3

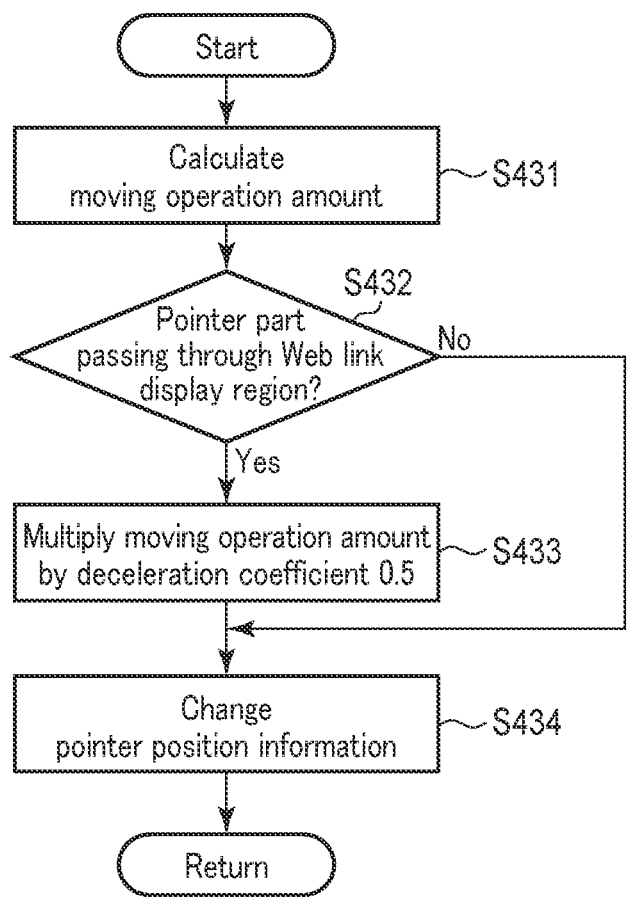
F I G. 5

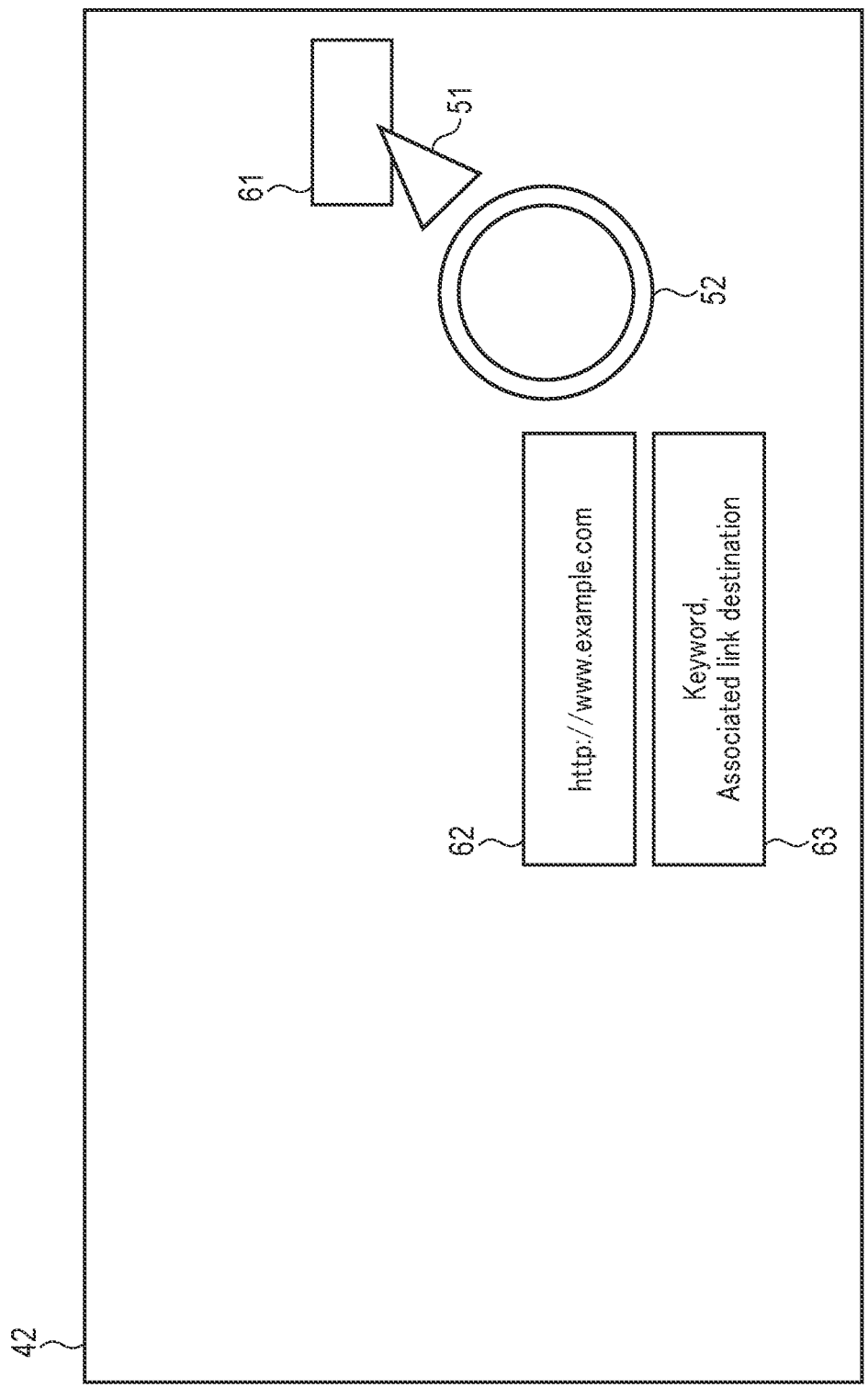
F I G. 11

TOUCH PANEL TYPE INFORMATION TERMINAL DEVICE, INFORMATION INPUT PROCESSING METHOD AND PROGRAM THEREOF

CROSS REFERENCE TO RELATED APPLICATIONS

This is a U.S. national phase application under 35 USC 371 of International Application PCT/JP2016/071743 (not published in English), filed Jul. 25, 2016. This application claims the benefit of and priority to Japanese Patent Application 2015-148687, filed Jul. 28, 2015.

FIELD

The present invention relates generally to a touch panel type information terminal device comprising a touch panel type input interface, and an information input processing method and program thereof.

BACKGROUND

Generally, in a user interface of a computer that has a mouse or a touch pad, a location of a point target is instructed by moving a mouse cursor. The mouse cursor has a shape in which, for example, the distal end is a sharp arrowhead, which is advantageous in precisely specifying a point target. Since the viewability of screen information displayed near the location of the point target would not be disturbed, a user can operate while in visual contact with the screen information. Therefore, there is an advantage in that even a specific point target can be distinguished from other point targets and accurately instructed.

However, most recently, an information terminal device having a touch panel that has an input sheet arranged on a display screen, as in a tablet type terminal, is becoming popular. This type of device can be operated intuitively since an operation target can be specified by directly touching the display screen by a finger. Furthermore, since it does not require an external input device such as a mouse or a touch pad, it is advantageous in that a shape of equipment that excels in portability can be realized (see, for example, non-patent literature 1).

CITATION LIST

Patent Literature

Non Patent Literature 1

"Touch panel technique article/technological trend of resistive touch panel", SMK Corporation, TP project department, reference: Denpa Publications, "touch panel technique" featured Oct. 10, 2013, internet <URL; http://www.smk.co.jp/products/touch_panels/technology/20131010dempaRTTP/>

SUMMARY

Technical Problem

To pursue the benefit of excelling in portability, a touch panel type information terminal device cannot, in general, be used in combination with an external input device such as a mouse or a touch pad. Therefore, it is unable to receive various operational advantages obtained by operating a mouse cursor by the external input device. For example, since the tip of a finger is not as sharp as that of a mouse cursor, it is difficult to accurately specify a point target. Furthermore, when a finger is brought closer to the touch panel, the screen becomes hidden by the finger, thereby causing a problem that the viewability of screen information displayed near the location of the point target would be disturbed. Furthermore, since a touch operation would be performed while the screen is hidden by the finger, it would be difficult to accurately instruct a specific point target by distinguishing it from the other point targets on the screen.

The present invention focuses on the above circumstances, and attempts to provide a touch panel type information terminal device, and an information input processing method and program thereof, which improve input operability by allowing the point target to be easily and accurately specified without disturbing the viewability of the point target and neighboring display information.

Solution to Problem (1) A touch panel type information terminal device on which an input sheet is arranged on a display screen, comprising: means for displaying on the display screen a touchable pointer comprising a pointer part for instructing a point target that is displayed on the display screen, and an operation part for a user to perform a touch operation; and means for integrally moving a display position of the operation part and the pointer part on the display screen in accordance with the touch operation of the user with respect to the operation part of the touchable pointer.

(2) The touch panel type information terminal device according to (1), further comprising rotation movement means, which, in a case where a touch operation for specifying a rotation angle is performed at any position on the input sheet, moves an arranged position of the pointer part with respect to the operation part by an amount corresponding to the specified rotation angle in accordance with the touch operation.

(3) The touch panel type information terminal device according to (2), wherein, in a case where a rotation movement operation is performed by fixing a first finger at one spot on the input sheet, and rotating and moving a second finger about the first finger on the input sheet, the rotation movement means moves an arranged position of the pointer part with respect to the operation part by an amount corresponding to a rotation angle specified by the rotation movement operation.

(4) The touch panel type information terminal device according to (1), further comprising means for executing access processing with respect to an information source corresponding to a point target instructed by the pointer part in a case where a tap operation that is shorter than a preset time is performed with respect to a predetermined tap region including the operation part.

(5) The touch panel type information terminal device according to (1), further comprising means for executing left-click event processing and right-click event processing with respect to a point target instructed by the pointer part in a case where a tap operation that is shorter than a preset time is performed with respect to a left-click input region and a right-click input region set respectively on a left side and a right side, centering on the operation part.

(6) The touch panel type information terminal device according to (1), further comprising additional information display means for displaying on the display screen information associated with an information source corresponding to a point target instructed by the pointer part.

(7) The touch panel type information terminal device according to (6), wherein, in a case where an information source corresponding to a point target instructed by the pointer part is a character string, the additional information display means acquires a sentence or a keyword describing a meaning of the word, and displays the acquired sentence or keyword on the display screen.

(8) The touch panel type information terminal device according to (6), wherein, in a case where an information source corresponding to a point target instructed by the pointer part is an image, the additional information display means acquires attribution information of the image, and displays the attribution information of the acquired image on the display screen.

(9) The touch panel type information terminal device according to (1), wherein at least the pointer part of the touchable pointer has transparency to allow a point target displayed on the display screen to become viewable.

(10) The touch panel type information terminal device according to (1), further comprising: means for determining whether or not the point target is instructed by the pointer part; and based on the determination result, means for displaying the pointer part and the operation part in a first display form in a state where the point target is not instructed, and displaying at least one of the pointer part and the operation part in a second display form that is different from the first display form in a state where the point target is instructed.

(11) The touch panel type information terminal device according to (1), wherein the means for integrally moving a display position of the operation part and the pointer part comprises: means for determining whether or not the pointer part has entered a display region of the point target during movement processing of the display position of the operation part and the pointer part; and means for setting a moving speed of the display position of when the pointer part has entered the display region of the point target slower than a moving speed of the display position before the entering.

(12) The touch panel type information terminal device according to (1), wherein the means for integrally moving a display position of the operation part and the pointer part comprises: means for determining whether or not the pointer part has entered a display region of the point target during movement processing of the display position of the operation part and the pointer part; and means for setting a moving speed of the display position of when the pointer part has entered the display region of the point target slower than a moving speed of the display position before the entering.

(13) The information input processing method according to (12), further comprising a process which, in a case where a touch operation for specifying a rotation angle is performed at any position on the input sheet, moves an arranged position of the pointer part with respect to the operation part by an amount corresponding to the specified rotation angle in accordance with the touch operation.

(14) A program for causing a processor included in a touch panel type information terminal device to execute the processing of each of the means included in the touch panel type information terminal device according to one of (1) to (11).

Advantageous Effects of Invention

According to the aspects of (1) and (12), since a pointer part is integrally moved in accordance with the movement of an operation part by a touch operation, it is possible to instruct a point target without disturbing the viewability of the display information near the point target by the finger in touch.

According to the aspects of (2), (3), and (13), since a display position of the pointer part can be rotated with respect to the operation part, it is possible to reliably instruct the point target at any edge on the upper, lower, left, or right side of the touch panel.

According to the aspect of (4), by recognizing a tap operation, it becomes possible at that point to access an information source that corresponds to the point target instructed by the pointer part. Therefore, it is possible to realize the same operation as a click operation using an ordinary mouse.

According to the aspect of (5), by recognizing a touch operation with respect to a left-click input region and a right-click input region set respectively on the left and right side of the operation part, it is possible to realize the same operation as a left-click operation and a right-click operation using an ordinary mouse.

According to the aspects of (6) to (8), for example, if the information source corresponding to a pointer target instructed by the pointer part is a character string, a sentence or a key word that presents the meaning of such word is displayed on the display screen, and if the information source corresponding to the pointer target is an image, attribution information of the image is display on the display screen. Therefore, a user is able to confirm the information associated with the information source before actually accessing the information source corresponding to the point target.

According to the aspect of (9), at least a part of the pointer part of a touchable pointer has translucency, which brings about an advantage in securing the viewability of information that is being displayed on the display screen.

According to the aspect of (10), a display form of the pointer part and the operation part changes depending on whether or not a point target is instructed by the pointer part. Therefore, the user is able to clearly recognize that it is in a state where the point target is instructed by the pointer part, i.e., that it is in a state where a tap operation can be performed.

According to the aspect of (11), when the pointer part enters a display region of a point target, the moving speed of the touchable pointer becomes slower than that prior to entering. In other words, the pointer part moves in a slower pace in the display region of the point target. Therefore, the time the pointer part stays inside the display region of the point target becomes long, which allows the user to easily stop the pointer part of the touchable pointer inside the display region of the point target. In other words, even in the case where the display region of the point target is small, instruction operability can be enhanced with respect to the point target.

In other words, according to the present invention, the point target can be easily and accurately instructed without disturbing the viewability of the point target and its neighboring display information. Therefore, a touch panel type information terminal device, and an information input processing method and program thereof attempting to enhance input operability can be provided.

BRIEF DESCRIPTION OF THE DRAWINGS

FIG. 1 is a block diagram showing a functional configuration of a touch panel type information terminal device according to an embodiment of the present invention.

FIG. 3 is a flowchart showing a procedure and processing content of point target specifying processing carried out by the device shown in FIG. 1.

FIG. 5 is a flowchart showing a procedure and content of touchable pointer position information changing processing in the touchable pointer movement processing shown in FIG. 4.

FIG. 11 shows an example of an additional information displaying action in the additional information displaying processing shown in FIG. 10.

DETAILED DESCRIPTION

Figure 2:
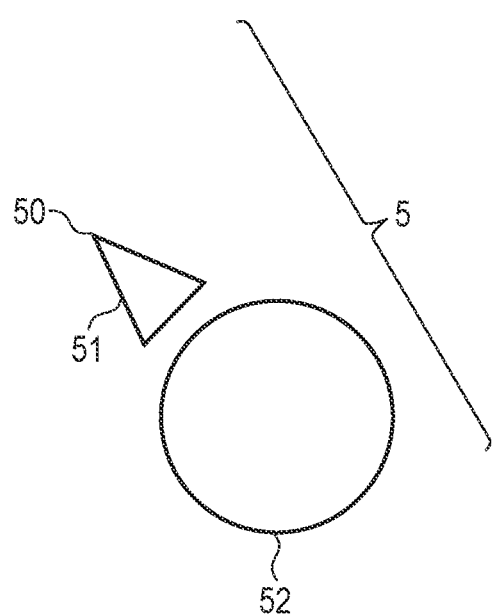
FIG. 2 shows a configuration example of a touchable pointer generated by the device shown in FIG. 1.

In the following, embodiments of the present invention will be explained with reference to the accompanying drawings.

Embodiment (Configuration)

FIG. 1 is a block diagram showing a functional configuration of a touch panel type information terminal device according to an embodiment of the present invention.

The touch panel type information terminal device is configured by, for example, a smart phone or a tablet type terminal, and comprises a controller 1, a storage unit 2, a wireless interface unit 3, and a user interface unit 4.

Under the control of the controller, the wireless interface unit 3 performs wireless communication between a communication counterpart terminal or a Web site by using, for example, a mobile phone network, a wireless Local Area Network (LAN), or a near-field wireless data communication network (for example, Bluetooth (registered trademark)).

The user interface unit 4 is configured by a touch panel type device which has an input device 41 configured by a sheet-like input device arranged on a display screen of a display device 42 of a liquid-crystal device, etc. The user interface unit 4 displays display data output from the controller 1 on the display device 42, and inputs to the controller 1 a touch operation of a user detected by, for example, a capacitance system. Any structure and system other than those mentioned above may be adopted for the structure of the touch panel type device and the detection system of the touch operation.

As a storage medium, the storage unit 2 uses a non-volatile memory such as a Solid State Drive (SSD), which is capable of writing and reading as needed. It has a region for storing an Operating System (OS) and an application program group for operating the controller 1. In addition, as a storage region for storing control data necessary for implementing the present embodiment, the storage unit 2 comprises a touchable pointer movement information storage part 21, a touchable pointer rotation information storage part 22, a movement start position information storage part 23, and a rotation start angle information storage part 24.

The controller 1 comprises a processor such as a Central Processing Unit (CPU), and, as a functional part for executing the processing according to the present embodiment, an application execution part 11 and an OS execution part 12 that executes the above Operating System (OS).

As its function, the OS execution part 12 comprises a browser 120, a figure-drawing processor 123, a character-drawing processor 124, a click event processor 125, and a touch event notification processor 126.

The browser 120 comprises a Web screen display processor 121 and a link determination part 122. The Web screen display processor 121 accesses a Web site in accordance with a Uniform Resource Locator (URL) instructed at the input device 41 of the user interface unit 4, downloads information of a Web page from the Web site, and displays it on the display device 42 of the user interface unit 4. In the case where the input device 41 detects that a certain coordinate on the displayed Web page has been specified, the link determination part 122 determines whether or not link information to other Web pages is described at a position corresponding to the coordinate of the Web page.

The figure-drawing processor 123 performs drawing processing of figure data, such as a circle, polygon, or straight line, on the display device 42. The character-drawing processor 124 performs processing of drawing character string data on the display device 42. In a state where a coordinate is specified on the touch panel, in the case where a left click or a right click is specified at its left or right position, the click event processor 125 generates the same click event as in the case of performing a click action using a mouse. In the case where a user performs a touch operation on the touch panel, the touch event notification processor 126 recognizes the touch operation and performs processing of notifying the matter to the application execution part 11.

The application execution part 11 executes processing regarding displaying a touchable pointer 5 and instructing link information using the touchable pointer 5. As shown in FIG. 2, for example, the touchable pointer 5 is configured by a pointer part 51 described as a triangle, and an operation part 52 described as a circle. A triangular distal end portion (pointer distal end part) 50 of the pointer part 51 becomes an instruction point of any coordinate on the touch panel.

In consideration of the size of a person's average finger tip, the size of the touchable pointer 5 is set so that the radius of the operation part 52 is 10 mm, and the distance from the center of the operation part 52 to the pointer distal end part 50 is about 20 mm. This size can be changed as appropriate. The operation part 52 and the pointer part 51 are displayed in a colored transparent state. In this manner, the display information directly beneath the operation part 52 and the pointer part 51 can be seen transparently.

The touchable pointer 5 may be configured in a manner that the pointer part 51 is described by other shapes, such as an arrow, a polygon, or a circle, and the pointer part 51 has locations other than the pointer distal end part 50 as the instruction point. Furthermore, the operation part 52 may also be described as a polygon.

As processing functions regarding the display of the touchable pointer 5 and the instruction of the link information, the application execution part 11 comprises a touchable pointer movement processor 111, a touchable pointer rotation processor 112, a tap processor 113, an additional information display processor 114, and an additional sentence generating processor 115.

In a state where the touchable pointer 5 is displayed on the touch panel, in the case where an operation of moving the operation part 52 on the touch panel is performed by a finger tip, the touchable pointer movement processor 111 performs processing of moving the display position of the touchable pointer 5 in accordance with such operation. Here, the pointer part 51 moves integrally with the operation part 52.

In a state where the touchable pointer 5 is displayed on the touch panel, in the case where an operation of drawing an arc as if operating a compass is performed by using two fingers, the touchable pointer rotation processor 112 detects the rotation angle thereof. In accordance with the detected rotation angle, the touchable pointer rotation processor 112 performs processing of rotating the arranged position of the pointer part 51 with respect to the operation part 52 of the touchable pointer 5 by an amount corresponding to the rotation angle. In other words, the touchable pointer rotation processor 112 functions as a rotation moving means.

In a state where the touchable pointer 5 is displayed on the touch panel, in the case where a touch operation is performed by using a finger tip at a time shorter than that set in advance with respect to a predetermined tap region that includes the touchable pointer 5, the tap processor 113 executes access processing with respect to an information source corresponding to a point target instructed by the pointer distal end part 50. In the case where an operation of tapping is performed within a predetermined range on the left or right of the touchable pointer 5, the tap processor 113 considers that a left-click operation or a right-click operation has been performed and performs processing of accepting input of such operation information.

In a state where link information to other Web sites is displayed on the touch panel, in the case where such link information is instructed by the touchable pointer 5, the additional information display processor 114 performs the processing of displaying the URL or the site name of the instructed link information and associated information of the link information on the display device 42 as additional information.

In accordance with a request from the additional information display processor 114, the additional sentence generating processor 115 performs processing of acquiring the associated information of the link information instructed by the touchable pointer 5 by, for example, accessing a summary engine of the Web server. For example, in the case where the point target instructed by the touchable pointer 5 is a character string, a sentence or a keyword that describes the meaning of such word is acquired. The acquisition processing of the sentence or the keyword can be easily realized by using, for example, morphological analysis or national language dictionary data. In the case where the point target instructed by the touchable pointer 5 is an image, attribution information such as the title and the resolution of the image, or photographing information is acquired. The acquisition processing of the attribution information of such image data can be realized by accessing a site that manages image data, such as an image production source or providing source.

(Operation)

In the following, display control of the touchable pointer and input instruction reception processing according to the touch panel type information terminal device configured in the above manner will be explained. FIG. 3 is a flowchart showing the overall processing procedure and the processing content.

(1) Displaying Touchable Pointer

Under the control of the application execution part 11, the touchable pointer 5 is displayed on the display device 42 by the figure-drawing processor 123 of the OS execution part 12. For example, drawing instruction information and display position data of the touchable pointer 5 are provided to the figure-drawing processor 123 of the OS execution part 12 from the application execution part 11. At the figure-drawing processor 123, based on the provided drawing instruction information, a figure pattern of the touchable pointer 5 shown in FIG. 2 is drawn in a specified size and display form at a position coordinate specified by the display position data on the touch panel. The touchable pointer 5 may be displayed on the touch panel at all times; however, it may also be switchable between display and non-display in accordance with the user's instruction operation.

(2) Moving Touchable Pointer

Suppose a user touches the operation part 52 of the touchable pointer 5 in a state where the touchable pointer 5 is displayed. This touch operation will be detected by the touch event notification processor 126 of the OS execution part 12, and notified from the touch event notification processor 126 to the application execution part 11. The touch operation event includes information indicating the number of touched spots, a touch position coordinate of each of the touched spots, and a touch operation type of each of the touched spots.

The type of touch operation includes "pressed", "moved", "released", and "tapped"; one of which will be notified as information indicating the touch operation type. Specifically, "pressed" indicates that a user's finger has come in contact with the touch panel, "moved" indicates that the finger is moved from such state along the touch panel, and "released" indicates that the finger has been released from the touch panel. In the case where a time from pressed to released is shorter than a predetermined time, it is identified as "tapped". The touch position coordinate is expressed by an x-value indicating a position in a horizontal (X-axis) direction, and a y-value indicating a position in a vertical (Y-axis) direction on the touch panel, which are expressed as (x,y).

Figure 4:
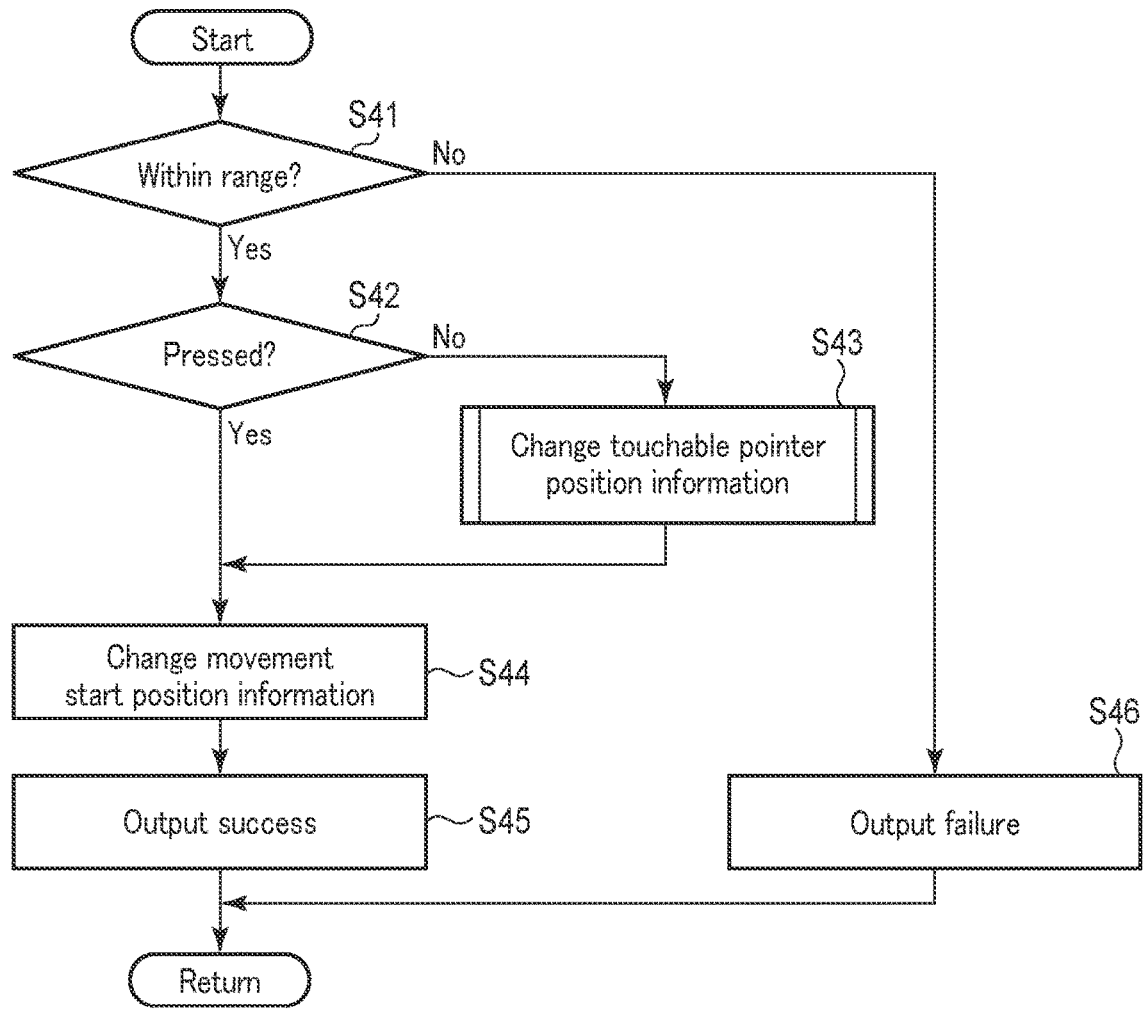
FIG. 4 is a flowchart showing a procedure and processing content of touchable pointer movement processing in the processing procedure shown in FIG. 3.

In regard to this, the application execution part 11 monitors the notification of the touch operation event in step S1. When the touch operation event is notified by the touch event notification processor 126 of the OS execution part 12, first, in step S2, the application execution part 11 determines whether or not the type of touch operation is "tapped" from the information indicating the touch operation type included in the touch operation event. If the result of this determination is not "tapped", then, in step S3, the application execution part 11 determines whether or not the number of touch operation spots is one. If the number of operation spots is one, a moving operation of the touchable pointer 5 is determined as being performed, and the step moves on to step S4, in which the touchable pointer movement processor 111 is activated to execute the moving processing of the touchable pointer in the following manner. FIG. 4 is a flowchart showing the processing procedure and the processing contents thereof.

In other words, first, in step S41, based on the position coordinate of the touch operation notified by the touch operation event and information of the touchable pointer 5 stored in the touchable pointer movement information storage part 21 of the storage unit 2, the touchable pointer movement processor 111 determines whether or not the touch position coordinate is within the display range of the operation part 52 of the touchable pointer 5. This is determined by calculating the current display range of the operation part 52 based on information indicating a current position coordinate and a radius of the operation part 52 of the touchable pointer 5 stored in the touchable pointer movement information storage part 21, and by comparing the touch position coordinate with a coordinate showing the current display range of the operation part 52. As a result of the determination in step S41, in the case where the touch position coordinate is outside the current display range of the operation part 52, the touchable pointer movement processor 111 outputs "failure" in step S46.

On the other hand, as a result of the determination in step S41, if the touch position coordinate exists within the current display range of the operation part 52, then, in step S42, the touchable pointer movement processor 111 determines whether or not the type of the touch operation event is "pressed". In the case where it is not "pressed", that is, in the case where it is "moved" or "released", the touchable pointer movement processor 111 executes the processing of updating the position information of the touchable pointer 5 in step S43 in the following manner. FIG. 5 is a flowchart showing the processing procedure and the processing contents thereof.

In other words, first, in step S431, the touchable pointer movement processor 111 calculates a moving operation amount from the current movement start position stored in the movement start position information storage part 23 of the storage unit 2 and the above-mentioned notified touch position coordinate. Then, in step S432, the touchable pointer movement processor 111 determines whether or not the pointer part 51 is passing through the display region of the Web link information in the process of the moving operation. As a result of this determination, if the pointer part 51 is not passing through the display region of the Web link information, the processing moves on to step S434. In step S434, the touchable pointer movement processor 111 uses the above calculated moving operation amount directly to update the position information of the touchable pointer 5 stored in the touchable pointer movement information storage part 21.

On the other hand, in the case where the pointer part is passing through the display region of the Web link information, in step S433, the touchable pointer movement processor 111 multiplies the above calculated moving operation amount by a preset deceleration coefficient (0.5). In accordance with the moving operation amount multiplied by this deceleration coefficient (0.5), the position information of the touchable pointer 5 stored in the touchable pointer movement information storage part 21 is updated. By this processing, the moving speed of the touchable pointer 5 is decreased during a period in which the touchable pointer 5 passes through the display region of the Web link information. This allows the pointer part of the touchable pointer 5 to stay longer within the display region of the Web link information, allowing the user to easily stop the pointer part 51 of the touchable pointer 5 within the display region of the Web link information. In other words, it is possible to enhance instruction operability of the Web link information.

In the above explanation, the moving speed of the touchable pointer 5 is decreased during the period in which it passes the display region of the Web link information; however, other methods may also be considered. For example, at the point where the pointer distal end part 50 of the touchable pointer 5 is detected as entering the display region of the link information, the touchable pointer movement processor 111 stores such detection time and the position coordinate of the pointer part 51. The moving speed of the touchable pointer 5 is set to a predetermined speed that is slower than usual by a preset time, for example, by one second, from the detection time. Alternatively, the touchable pointer movement processor 111 sets the moving speed of the touchable pointer 5 to a predetermined speed that is slower than usual until the position of the touchable pointer 5 moves a preset predetermined distance from the stored position coordinate.

Furthermore, in a state where the pointer distal end part 50 of the touchable pointer 5 is positioned in the display region of the link information, the touchable pointer movement processor 111 may change the display form, such as the display color or size, of the pointer part 51 or the operation part 52 of the touchable pointer 5. At the point where the touchable pointer 5 enters the display region of the Web link information, the touchable pointer movement processor 111 may generate a notification sound from a loudspeaker of the touch panel type information terminal device, vibrate a vibrator, or lit or flash an LED. In this manner, the user can clearly recognize a state in which the Web link information is instructed by the pointer part 51, that is, a state where a tap operation is possible.

When the processing of updating the position information of the touchable pointer in the above step S43 is ended, the touchable pointer movement processor 111 updates the movement start position coordinate stored in the movement start position information storage part 23 to the above touch position coordinate in step S44, and, finally, outputs "success" as a movement result of the touchable pointer 5 in step S45.

In step S7, the application execution part 11 determines whether "success" or "failure" has been output from the touchable pointer movement processor 111. In the case where "success" is output, in step S8, the application execution part 11 provides the drawing instruction information and the display position data of the touchable pointer 5 to the figure-drawing processor 123 of the OS execution part 12 in accordance with the above-mentioned moving operation of the finger. The figure-drawing processor 123 changes the drawing position of the figure pattern of the touchable pointer 5 based on the provided drawing instruction information. In the case where "failure" is output from the touchable pointer movement processor 111, in step S10, the application execution part returns the touch operation event to the touch event notification processor 126 of the OS execution part 12.

In the above explanation, in the case where the touch position coordinate included in the touch operation event is outside the display range of the operation part 52 of the touchable pointer 5, the touchable pointer movement processor 111 did not allow the touchable pointer 5 to move. However, the touchable pointer movement processor 111 may also omit the determination of whether or not the touch position coordinate included in the touch operation event is within the display range of the operation part 52 of the touchable pointer 5, and may move the touchable pointer 5 using the touch operation event outside the range of the operation part 52.

Figure 6:
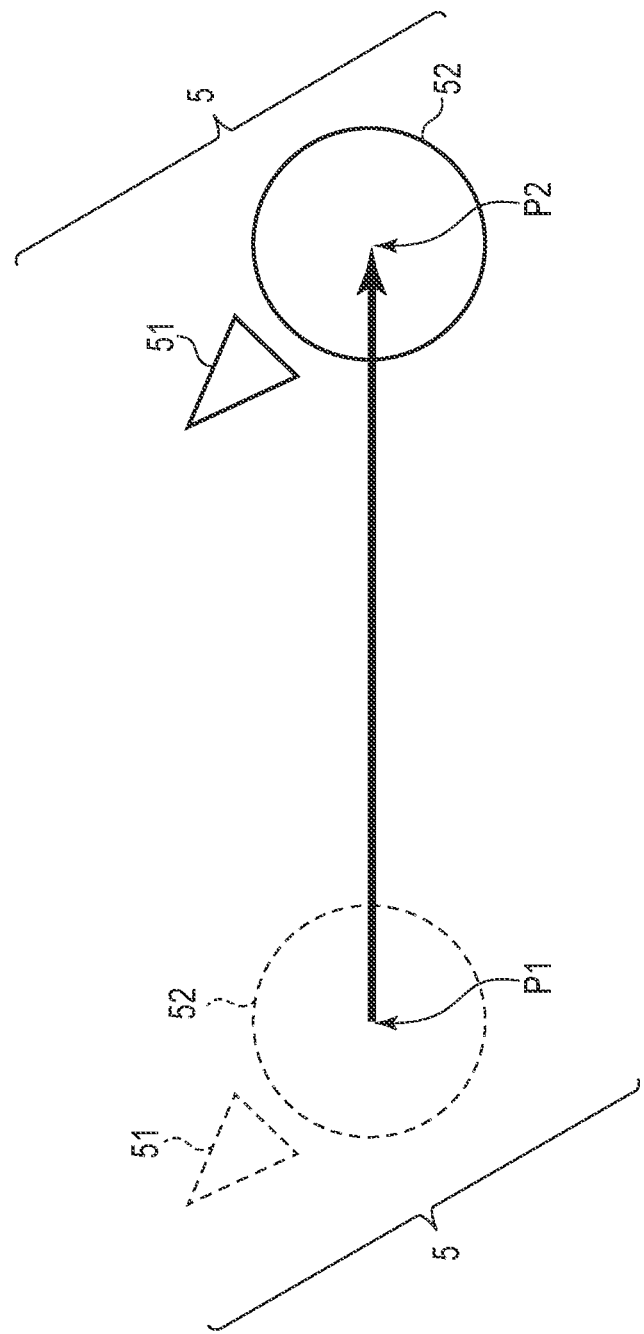
FIG. 6 shows an example of a movement of the touchable pointer in the touchable pointer movement processing shown in FIG. 4.

FIG. 6 shows an example of a movement of the touchable pointer 5 mentioned above. FIG. 6 shows an aspect of the movement of the drawing position of the touchable pointer 5 in the case there a user presses point P1 on the touch panel by a finger and releases the finger from the touch panel after moving it to point 2 while still touching the touch panel. In FIG. 6, the display position before moving the touchable pointer 5 is shown by a dotted line, and the display position after moving is shown by a solid line. When moving the touchable pointer 5, during a period in which the finger continuously touches the touch panel, the OS execution part 12 successively generates the touch operation event by the touch event notification processor 126. Therefore, the touchable pointer movement processor 111 continuously displays a movement locus of the touchable pointer 5 at a section from an operation starting point P1 to an end point P2.

In the above explanation, during a period in which the user continuously touches the touch panel by a finger, the touchable pointer movement processor 111 had the drawing position of the touchable pointer 5 move along with the change in the touch position. However, it is not limited to the above. Therefore, during a period in which the user continuously touches the touch panel by a finger, the touchable pointer movement processor 111 may have the position of the touchable pointer 5 held at a position before starting the operation, and moved to a position where the operation is ended after the moving operation is ended.

(3) Rotating Touchable Pointer

Figure 7:
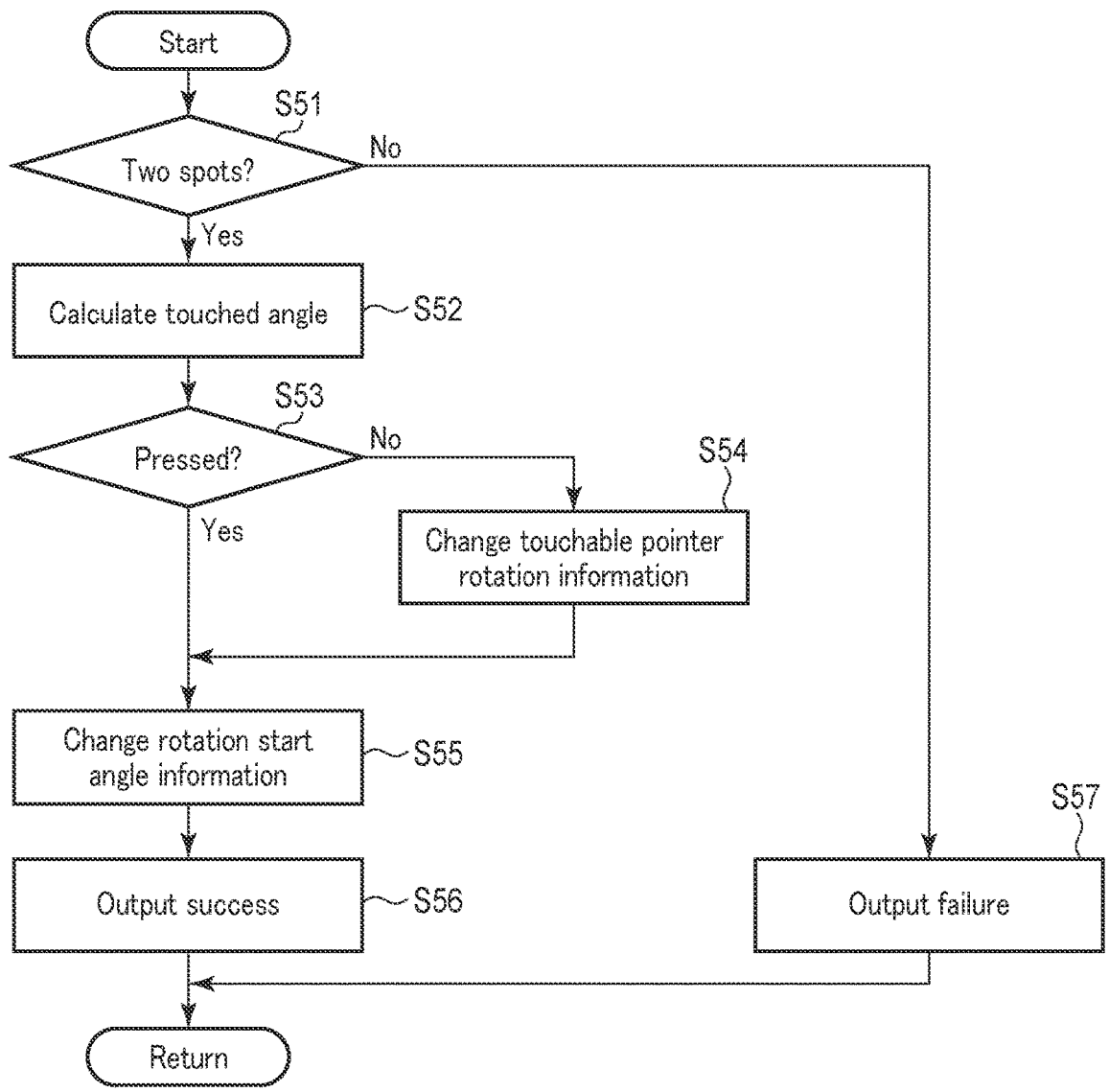
FIG. 7 is a flowchart showing a procedure and processing content of touchable pointer rotation processing in the processing procedure shown in FIG. 3.

The application execution part 11 determines whether or not the number of touch operation spots is one in step S3 based on the number of touch spots included in the touch operation event notified from the touch event notification processor 126 of the OS execution part 12. If the number of operation spots is not one, a rotation operation of the touchable pointer 5 is determined as being performed, and the step moves on to step S5, where the touchable pointer rotation processor 112 is activated, and the rotation processing of the touchable pointer is performed in the following manner. FIG. 7 is a flowchart showing the processing procedure and the processing contents thereof.

In other words, first, in step S51, the touchable pointer rotation processor 112 determines whether or not the number of spots simultaneously touch-operated is two. If the number of spots where the touch operation is performed is not two, "failure" is output in step S56, and the touchable pointer rotation processing is ended.

In contrast, in the case where the number of spots where the touch operation is performed is two, the touchable pointer rotation processor 112 calculates the rotation angle of the touched spots in step S52. This rotation angle is calculated by using a trigonometric function based on the touch position coordinate of each of the two touch positions included in the touch operation event. Specifically, an angle of a straight line joining the two touched spots with respect to the X-axis is calculated.

Then, in step S53, the touchable pointer rotation processor 112 determines whether or not the touch operation type of each of the touched spots is "pressed" based on the touch operation event. If the touch operation type of each of the touched spots is not "pressed", in step S54, the touchable pointer rotation processor 112 uses the difference between the calculated angle and the rotation start angle stored in the rotation start angle information storage part 24 of the storage unit 2 to add and subtract the touchable pointer rotation information. Subsequently, in step S55, the touchable pointer rotation processor 112 updates the value stored in the rotation start angle information storage part 24 using the calculated angle, and, lastly, in step S57, outputs "success".

In step S7, the application execution part 11 determines whether "success" or "failure" has been output from the touchable pointer rotation processor 112. In the case where "success" is output, in step S8, the application execution part 11 provides the drawing instruction information and the display position data of the touchable pointer 5 to the figure-drawing processor 123 of the OS execution part 12 in accordance with the above-mentioned rotation operation of the finger. The figure-drawing processor 123 changes the drawing position of the figure pattern of the touchable pointer 5 based on the provided drawing instruction information. In the case where "failure" is output from the touchable pointer rotation processor 112, in step S10, the application execution part returns the touch operation event to the touch event notification processor 126 of the OS execution part 12.

Figure 8A:
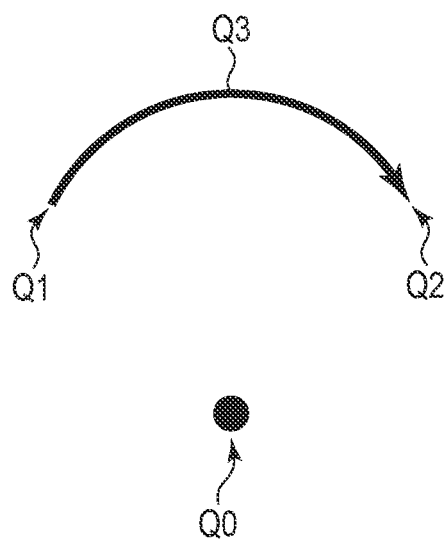
FIG. 8A shows an example of a rotating action of the touchable pointer in the touchable pointer rotation processing shown in FIG. 7.
Figure 8B:
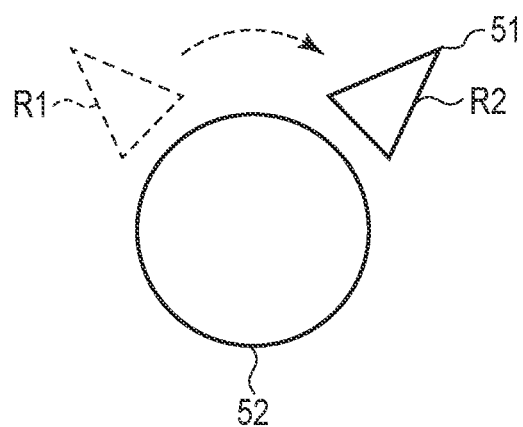
FIG. 8B shows an example of a rotating action of the touchable pointer in the touchable pointer rotation processing shown in FIG. 7.

FIGS. 8A and 8B show an example of an operation of the touchable pointer rotation processing. As shown in, for example, FIG. 8A, suppose a user moves a finger (for example, an index finger) from point Q1 to Q2 on the touch panel as if to draw an arc by a compass in a state where another finger (for example, a thumb) presses point Q0, and releases the finger. Q3 of FIG. 8A shows its movement locus. In this case, as shown in, for example, FIG. 8B, the figure pattern of the touchable pointer 5 changes in a manner where the drawing position of the pointer part 51 rotates from R1 to R2 following the rotation operation of the above-mentioned index finger.

In the above explanation, the application execution part 11 draws the position of the pointer part 51 of the touchable pointer 5 following the compass-like rotation operation that uses two fingers. However, it is not limited to the above. Therefore, the application execution part 11 may maintain the drawing position of the touchable pointer in a state before the operation until the rotation operation of the finger is ended, and change the drawing position after the rotation operation is ended.

In the above operation, in the case where the content of the touch operation event received from the touch event notification processor 126 of the OS execution part 12 indicates that the number of touched spots on the touch panel is two, the application execution part 11 implements the processing of rotating the display position of the touchable pointer 5 at any spot on the touch panel. However, it is not limited to the above. Therefore, in the case where the user performs rotation operation of the two spots on the operation part 52 of the touchable pointer 5 displayed on the touch panel, the application execution part 11 may also perform the processing of rotating the display position of the touchable pointer 5.

Furthermore, in the above operation example, an example of a user fixing a thumb on Q0 and moving an index finger from Q1 to Q2 as shown in FIG. 8A is explained. However, it is not limited to the above. Therefore, in a state where two fingers are touching the touch panel, the user may rotate and move both fingers on the touch panel without having one of the fingers fixed. In this case, the application execution part 11 calculates the movement angle from the touch position coordinates of the two fingers rotated and moved on the touch panel, and rotates the display position of the pointer part 51 of the touchable pointer 5.

Furthermore, instead of rotating the position of the pointer part 51 by the rotation operation of the two fingers of a user, the application execution part 11 may display a button for rotation operation on the touch panel and, in the case where the user performs rotation operation on the button, may allow the display position of the pointer part 51 to be rotated.

Even at a position close to, for example, four sides or four corners of the touch panel at which the display position of the pointer part 51 with respect to the operation part 52 of the touchable pointer 5 is rotated, the pointer part 51 and the operation part 52 of the touchable pointer 5 can be displayed without partially missing. This allows the point target to be instructed by the pointer part 51 at any position it is displayed on the touch panel.

(4) Tap Processing

In step S2, the application execution part 11 determines whether or not the type of touch operation is a "tap", based on information indicating the touch operation type included in the touch operation event notified from the touch event notification processor 126 of the OS execution part 12. This "tap" is determined by determining whether or not the time from being pressed to being released by the touch operation is shorter than a predetermined time.

Figure 9:
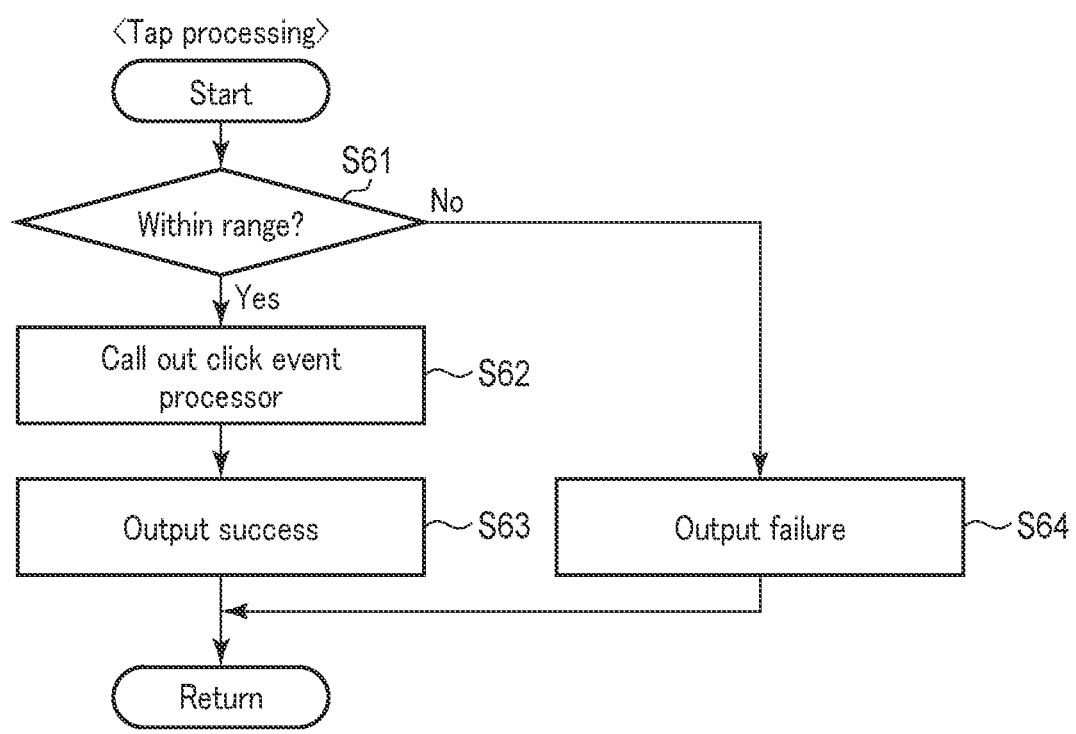
FIG. 9 is a flowchart showing a procedure and processing content of tap processing in the processing procedure shown in FIG. 3.

As a result, when "tap" is determined, in step S6, the application execution part 11 activates the tap processor 113 to perform tap processing in the following manner. FIG. 9 is a flowchart showing the processing procedure and the processing content thereof.

First, in step S61, based on the position coordinate of the touch operation included in the above touch operation event and information of the touchable pointer 5 stored in the touchable pointer movement information storage part 21 of the storage unit 2, the tap processor 113 determines whether or not the touch position coordinate is within the range of the operation part 52 of the touchable pointer 5. The tap processor 113, for example, calculates the current display range of the operation part 52 from a current position coordinate of the operation part 52 of the touchable pointer 5 and a radius of the operation part 52 stored in the touchable pointer movement information storage part 21. Then, the tap processor 113 performs the above determination by comparing the touch position coordinate with a coordinate indicating the current display range of the calculated operation part 52. As a result of the above determination, in the case where the touch position coordinate is outside the current display range of the operation part 52, the tap processor 113 outputs "failure" in step S64.

On the other hand, as a result of the above determination, if the touch position coordinate is included in the current display range of the operation part 52, the tap processor 113 calls out the click event processor 125 of the OS execution part 12 in step S62. The click event processor 125 generates a left-click event indicating that a left click is specified with respect to the coordinate of the pointer distal end part 50 on the touch panel. The coordinate of the pointer distal end part 50 on the touch panel can be uniquely obtained by using a positional relationship between the pointer distal end part 50 and the operation part 52 shown in FIG. 2, a center coordinate of the operation part 52 stored in the touchable pointer movement information storage part 21, and a rotation angle of the pointer part 51 stored in the touchable pointer rotation information storage part 22. Lastly, in step S63, the tap processor 113 outputs "success" as the tap processing result, and ends the tap processing.

The above explanation gives an example of a case in which, when the touch operation is detected, a left-click event is generated by the click event processor 125. However, it is not limited to this. Therefore, in the case where the tap operation is detected, a right-click event may be generated by the click event processor 125.

Furthermore, a left/right-click input region may be provided on both left and right sides of the operation part 52, or at any place on the touch panel so that, when each of the regions is tapped by a user, the click event processor 125 generates a left/right-click event. Furthermore, a left/right-click switching button may be arranged at the edge of the touch panel, or beside the operation part 52 of the touchable pointer 5, etc., so that a user may perform a tap operation on the switching button to perform input switching between the left click and the right click.

By the tap processor 113 configured in the above manner, a left/right-click operation can be performed in the same manner as in the case of using a mouse on the touch panel. In the case where the touch position coordinate included in the touch operation event is outside the range of the operation part 52, the application execution part 11 does not call out the click event processor 125. By doing so, even in a case where the touchable pointer 5 is displayed on the display screen of the touch panel, the user can be prevented from being disturbed when performing a direct tap operation with respect to other elements displayed on the screen. However, it is not limited to the above. Therefore, in the case where the user performs a tap operation at any tap region set on the touch panel, a click event may be generated to indicate that a click operation has been performed with respect to the coordinate instructed by the pointer distal end part 50.

(5) Displaying Additional Information

Figure 10:
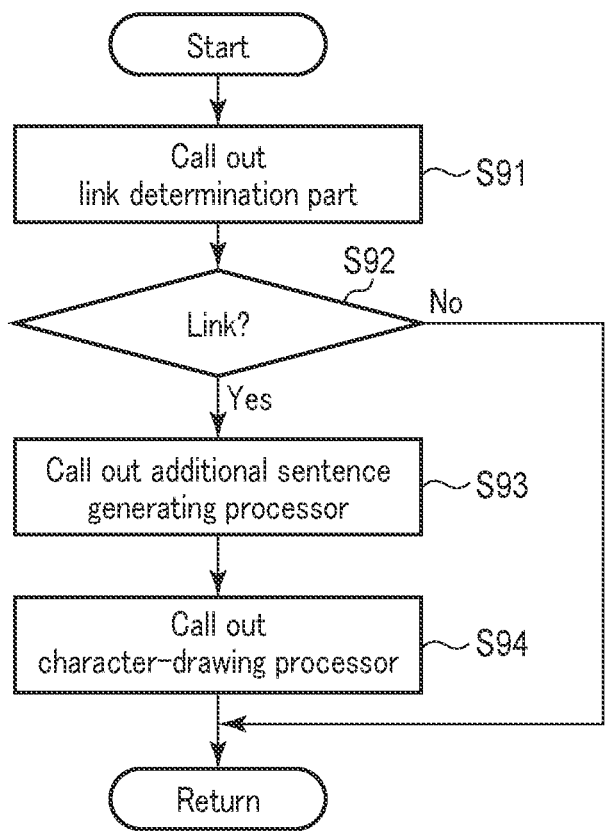
FIG. 10 is a flowchart showing a procedure and processing content of additional information display processing in the processing procedure shown in FIG. 3.

When the figure-drawing processor 123 of the OS execution part 12 ends the drawing processing of the touchable pointer 5, the application execution part 11 activates the additional information display processor 114 in step S9, and, under the control of this additional information display processor 114, executes display processing of the additional information in the following manner. FIG. 10 is a flowchart showing the processing procedure and the processing content thereof.

In other words, in step S91, the additional information display processor 114 calculates the coordinate of the pointer distal end part 50 on the touch panel from the touchable pointer movement information stored in the touchable pointer movement information storage part 21 and the touchable pointer rotation information stored in the touchable pointer rotation information storage part 22 of the storage unit 2. Based on the calculated coordinate, the additional information display processor 114 calls out the link determination part 122 of the browser 120 and receives a link determination result. In step S92, the additional information display processor 114 determines whether a true/false value included in the received link determination result is "true" or "false". If "false", the additional information display processor 114 determines that the link information is not displayed on the coordinate instructed by the pointer distal end part 50, and ends the processing.

In contrast, if the true/false value included in the above link determination result is "true", the additional information display processor 114 calls out the additional sentence generating processor 115 in step S93. The additional sentence generating processor 115, for example, accesses a summary engine of the Web server, and acquires associated information of the link information instructed by the above touchable pointer 5. For example, in the case where the point target instructed by the touchable pointer 5 is a character string, the additional sentence generating processor 115 acquires a sentence or a keyword that describes the meaning of such word. The acquisition processing of the sentence or the keyword can be easily realized by using, for example, morphological analysis or language dictionary data. In the case where the point target instructed by the touchable pointer 5 is an image, the additional sentence generating processor 115 acquires detailed attribution information such as the title and the resolution of the image, or photographing information. The acquisition processing of the attribution information of such image data can be realized by accessing a site that manages image data, such as an image production source or providing source. As associated information, advertisement information, such as a site, may also be acquired.

The additional information display processor 114 calls out the character-drawing processor 124 of the OS execution part 12 in step S94, and requests drawings of a character string indicating the URL included in the link determination result received from the link determination part 122 and a sentence indicating the associated information acquired by the additional sentence generating processor 115. In accordance with the drawing request, the character-drawing processor 124 displays the character string indicating the URL and the sentence indicating the associated information on the touch panel, and ends the processing.

FIG. 11 shows a display example of a case in which, in a state where a Web page is displayed on the display device 42, the touchable pointer 5 is superimposed on the Web page and displayed. On the Web page, Web link information 61 to access another site is displayed. In this state, suppose the user moves and rotates the touchable pointer 5 by a finger to instruct the Web link information 61 by the pointer distal end part 50. When doing so, a character string 62 that indicates the URL of the instructed Web link information and a sentence 63 that explains the meaning of a keyword or a word associated with the Web link information 61 are displayed at a position adjacent to the operation part 52 of the touchable pointer 5 as additional information associated with the Web page of the link destination.

By displaying the URL and the associated information of the Web link instructed by the touchable pointer 5 as the additional information in the above manner, the user is able to confirm the URL and the associated information of the instructed Web link when performing an instruction operation of the Web link.

FIG. 11 shows a case in which the display pattern of the operation part 52 is a double circle in a state where the pointer part 51 of the touchable pointer 5 is positioned within the display region of the link information 61. In this manner, it is obvious to the user that a tap operation can be performed on the touchable pointer 5.

As other methods of displaying that a tap operation is performable on the touchable pointer 5, the following may be considered. For example, the shape, size, and display color of the pointer part 51 or the operation part 52 may be changed or made to blink. An animation technique may also be used to move the pointer part 51 or the operation part 52, or the pointer part 51 or the operation part 52 may be stereoscopically displayed by a 3D display technique. As other methods, a vibrator may be vibrated, or an LED may be lit or made to blink.

Advantageous Effects

As described in detail, in the embodiment, the touchable pointer 5 comprising the pointer part 51 and the operation part 52 that are separated from each other and displayed with an interval therebetween is displayed on the touch panel. The operation part 52 is operated by a finger to move the pointer part 51 so that any point target may be instructed by the pointer distal end part 50.

Therefore, the point target can be instructed without the finger touching the touch panel disturbing the viewability of the display information around the point target. The point target displayed at the edge of the touch panel can also be easily instructed. Since the display position of the pointer part 51 can be rotated with respect to the operation part 52, it is possible to instruct any edge on the upper, lower, left, or right side of the touch panel.

Furthermore, since the point target is instructed by the pointer distal end part 50 that is smaller than an operating finger, and not by the operation part 52 the user actually touches by a finger, even a point target that is difficult to specify by a finger, such as a point target in a small display size or a plurality of point targets arranged adjacent to each other, can be accurately instructed. Generally, in Web content, in many cases, small point targets are arranged adjacently. Therefore, it is difficult to accurately instruct these point targets with a finger. Therefore, to use the touchable pointer according to the present embodiment is quite effective in practical use. This is also effective in a case where the screen size of the touch panel is small, such as in a smart phone, and the displayed point target becomes small.

Furthermore, in the present embodiment, the size of the figure of the touchable pointer 5 is a fixed value, and pinch-in and pinch-out operations by two fingers are made non-detectable by the application execution part 11. By doing so, the operation would not be disturbed even in the case where the pinch-in and pinch-out operations are allocated to the operations of reducing and enlarging the Web browsing screen when performing Web browsing. The pinch-in and pinch-out operations may reduce or enlarge the touchable pointer 5, or may reduce or enlarge only the operation part 52.

Furthermore, in the present embodiment, the moving speed of the touchable pointer 5 is reduced during a period in which the touchable pointer 5 passes through the display region of the Web link information. This allows the pointer part 51 of the touchable pointer 5 to stay longer within the display region of the Web link information, allowing the user to easily stop the pointer part 51 of the touchable pointer 5 within the display region of the Web link information. In other words, it is possible to enhance instruction operability of the Web link information.

Furthermore, in the present embodiment, in a state where the pointer distal end part 50 of the touchable pointer 5 is positioned in the display region of the link information, the display form of the pointer part 51 or the operation part 52 of the touchable pointer 5 is changed, or at a point the touchable pointer 5 enters the display region of the Web link information, a notification sound is generated, a vibrator is vibrated, or an LED is lit or flashed. Therefore, the user can clearly recognize a state in which the Web link information is instructed by the pointer part 51, that is, a state where a tap operation is possible.

In the case where the point target instructed by the touchable pointer 5 is a character string, a sentence or a keyword that describes the meaning of such word is acquired. The acquisition processing of this sentence or keyword can be easily realized by using, for example, morphological analysis or language dictionary data. In the case where the point target instructed by the touchable pointer 5 is an image, detailed attribution information such as the title and the resolution of the image, or photographing information is acquired. The acquisition processing of the attribution information of such image data can be realized by accessing a site that manages image data, such as an image production source or providing source. As associated information, advertisement information, such as a site, may also be acquired.

Furthermore, in the present embodiment, in a state where the touchable pointer 5 instructs the point target, a character string that indicates a URL corresponding to the site of the point target, and associated information, for example, detailed attribution information such as a sentence or a keyword describing the meaning of the word, the title, and resolution of an image, and photographing information, are displayed on the touch panel. Therefore, when the user performs an instruction operation on a Web link, the URL of the instructed Web link and the associated information can be confirmed.

Other Embodiments

In the above embodiment, the character string 62 indicating the URL of a link destination was displayed as information summarizing the page content of the link destination; however, this may also be a summary of a sentence of the link destination, a word frequently appearing in a sentence of the link destination, or an image describing Web content of the link destination.

In the above embodiment, the information describing the summary of a page content of a link destination is displayed adjacent to the touchable pointer 5 as additional information; however, this may also be displayed at any place on the touch panel, or by being wirelessly transmitted to another display device or another information terminal device.

Furthermore, the display processing of the additional information allows the user to visually confirm the additional information of the link destination. Therefore, a brief summary of the site of the link destination can be confirmed without having to actually access the site of the link destination and download the information. Therefore, not only can the information of the Web content be rapidly confirmed, but a mistaken selection of a link can also be reduced.

Furthermore, although being a user interface using a touch panel, an advanced type of operation that is the same as when using a mouse and a touch pad, etc. can be obtained by successively displaying the summary and the associated information of the point target instructed by the pointer distal end part 50 in the process of moving the touchable pointer 5 with a finger touching the touch panel. In addition, when doing so, despite using a touch panel, there is an advantage in that the finger would not disturb the viewability of the image information.

The type and configuration of the device, the type of OS, the shape and size of the touchable pointer, the display color, and the display form (whether or not to be transparent, etc.) may also be modified and implemented within a range that would not depart from the gist of the invention.

That is, the present invention is not limited to the above-described embodiments and can be embodied in practice by modifying the structural elements without departing from the gist of the invention. In addition, various inventions can be made by properly combining the structural elements disclosed in connection with the above embodiments. For example, some of the structural elements may be deleted from the entire structural elements described in the embodiments. Furthermore, structural elements of different embodiments may be appropriately combined.

REFERENCE SIGNS LIST

1 . . . control unit, 2 . . . storage unit, 3 . . . wireless interface unit, 4 . . . user interface unit, 5 . . . touchable pointer, 11 . . . application execution part, 12 . . . OS execution part, 21 . . . touchable pointer movement information storage part, 22 . . . touchable pointer rotation information storage part, 23 . . . movement start position information storage part, 24 . . . rotation start angle information storage part, 41 . . . input device, 42 . . . display device, 50 . . . pointer distal end part, 51 . . . pointer part, 52 . . . operation part, 61 . . . link information as point target, 62, 63 . . . additional information, 111 . . . touchable pointer movement processor, 112 . . . touchable pointer rotation processor, 113 . . . tap processor, 114 . . . additional information display processor, 115 . . . additional sentence generating processor, 120 . . . browser, 121 . . . Web screen display processor, 122 . . . link determination part, 123 . . . figure-drawing processor, 124 . . . character-drawing processor, 125 . . . click event processor, 126 . . . touch event notification processor

The invention claimed is:

1. A touch panel type information terminal device on which an input sheet is arranged on a display screen, comprising:
    means for displaying on the display screen a touchable pointer comprising a pointer part for instructing a point target that is displayed on the display screen, and an operation part for a user to perform a touch operation; and
    means for integrally moving a display position of the operation part and the pointer part on the display screen in accordance with the touch operation of the user with respect to the operation part of the touchable pointer;
    means for determining whether or not the point target is instructed by the pointer part; and
    based on the determination result, means for displaying the pointer part and the operation part in a first display form in a first state where the point target is not instructed, and displaying at least one of the pointer part and the operation part in a second display form that is different from the first display form in a second state where the point target is instructed and being notified by information concerning at least one sense other than a visual sense in the second state.

2. The touch panel type information terminal device according to claim 1, further comprising rotation movement means, which, in a case where a touch operation for specifying a rotation angle is performed at any position on the input sheet, moves an arranged position of the pointer part with respect to the operation part by an amount corresponding to the specified rotation angle in accordance with the touch operation.

3. The touch panel type information terminal device according to claim 2, wherein, in a case where a rotation movement operation is performed by fixing a first finger at one spot on the input sheet, and rotating and moving a second finger about the first finger on the input sheet, the rotation movement means moves an arranged position of the pointer part with respect to the operation part by an amount corresponding to a rotation angle specified by the rotation movement operation.

4. The touch panel type information terminal device according to claim 1, further comprising means for executing access processing with respect to an information source corresponding to a point target instructed by the pointer part in a case where a tap operation that is shorter than a preset time is performed with respect to a predetermined tap region including the operation part.

5. The touch panel type information terminal device according to claim 1, further comprising means for executing left-click event processing and right-click event processing with respect to a point target instructed by the pointer part in a case where a tap operation that is shorter than a preset time is performed with respect to a left-click input region and a right-click input region set respectively on a left side and a right side, centering on the operation part.

6. The touch panel type information terminal device according to claim 1, further comprising additional information display means for displaying on the display screen information associated with an information source corresponding to a point target instructed by the pointer part.

7. The touch panel type information terminal device according to claim 6, wherein, in a case where an information source corresponding to a point target instructed by the pointer part is a character string, the additional information display means acquires a sentence or a keyword describing a meaning of the word, and displays the acquired sentence or keyword on the display screen.

8. The touch panel type information terminal device according to claim 6, wherein, in a case where an information source corresponding to a point target instructed by the pointer part is an image, the additional information display means acquires attribution information of the image, and displays the attribution information of the acquired image on the display screen.

9. The touch panel type information terminal device according to claim 1, wherein at least the pointer part of the touchable pointer has transparency to allow a point target displayed on the display screen to become viewable.

10. The touch panel type information terminal device according to claim 1, wherein the means for integrally moving a display position of the operation part and the pointer part comprises:
    means for determining whether or not the pointer part has entered a display region of the point target during movement processing of the display position of the operation part and the pointer part; and
    means for setting a moving speed of the display position of when the pointer part has entered the display region of the point target slower than a moving speed of the display position before the entering.

11. An information input processing method executed by a touch panel type information terminal device on which an input sheet is arranged on a display screen, comprising:
    a process for displaying on the display screen a touchable pointer comprising a pointer part for instructing a point target that is displayed on the display screen, and an operation part for a user to perform a touch operation;
    a process for integrally moving a display position of the operation part and the pointer part on the display screen in accordance with the touch operation of the user with respect to the operation part of the touchable pointer;
    a process for determining whether or not the point target is instructed by the pointer part; and
    based on the determination result, a process for displaying the pointer part and the operation part in a first display form in a first state where the point target is not instructed, and displaying at least one of the pointer part and the operation part in a second display form that is different from the first display form in a second state where the point target is instructed and being notified by information concerning at least one sense other than a visual sense in the second state.

12. The information input processing method according to claim 11, further comprising a process which, in a case where a touch operation for specifying a rotation angle is performed at any position on the input sheet, moves an arranged position of the pointer part with respect to the operation part by an amount corresponding to the specified rotation angle in accordance with the touch operation.

13. A computer program product stored on a non-transitory computer readable medium comprising instructions executed by touch panel type information terminal device on which an input sheet is arranged on a display screen, the instructions including code for:
    displaying on the display screen a touchable pointer comprising a pointer part for instructing a point target that is displayed on the display screen, and an operation part for a user to perform a touch operation;
    integrally moving a display position of the operation part and the pointer part on the display screen in accordance with the touch operation of the user with respect to the operation part of the touchable pointer;
    determining whether or not the point target is instructed by the pointer part; and
    based on the determination result, displaying the pointer part and the operation part in a first display form in a first state where the point target is not instructed, and displaying at least one of the pointer part and the operation part in a second display form that is different from the first display form in a second state where the point target is instructed and being notified by information concerning at least one sense other than a visual sense in the second state.

14. The touch panel type information terminal device according to claim 1, wherein the at least one sense includes at least one of a sound, a vibration, or a light.

* * * * *